US010493797B2

(12) United States Patent
Davis et al.

(10) Patent No.: US 10,493,797 B2
(45) Date of Patent: Dec. 3, 2019

(54) TRUCK WHEEL

(71) Applicant: CONSOLIDATED METCO, INC., Vancouver, WA (US)

(72) Inventors: Chris Davis, Boring, OR (US); Naren Ambati, Vancouver, WA (US); Walter Koc, Portland, OR (US); Richard J. Kilshaw, Lake Oswego, OR (US); Matthew J. Ferguson, Portland, OR (US)

(73) Assignee: Consolidated Metco, Inc., Vancouver, WA (US)

( * ) Notice: Subject to any disclaimer, the term of this patent is extended or adjusted under 35 U.S.C. 154(b) by 342 days.

(21) Appl. No.: 15/184,415

(22) Filed: Jun. 16, 2016

(65) Prior Publication Data

US 2017/0361646 A1   Dec. 21, 2017

(51) Int. Cl.
*B60B 5/02* (2006.01)
*B29C 45/00* (2006.01)
*B29C 45/14* (2006.01)
*B60B 3/00* (2006.01)
*B60B 3/06* (2006.01)
(Continued)

(52) U.S. Cl.
CPC ............ *B60B 5/02* (2013.01); *B29C 45/0005* (2013.01); *B29C 45/14336* (2013.01); *B29C 45/1615* (2013.01); *B60B 3/007* (2013.01); *B60B 3/02* (2013.01); *B60B 3/06* (2013.01); *B60B 3/12* (2013.01); *B22D 21/04* (2013.01); *B29K 2105/105* (2013.01); *B29K 2307/04* (2013.01); *B29K 2309/08* (2013.01); *B29K 2705/02* (2013.01); *B29L 2031/32* (2013.01); *B60B 2310/202* (2013.01); *B60B 2310/204* (2013.01); *B60B 2360/104* (2013.01); *B60B 2360/3412* (2013.01); *B60B 2360/3416* (2013.01); *B60B 2900/111* (2013.01); *B60B 2900/711* (2013.01)

(58) Field of Classification Search
CPC ....... B29C 70/02; B29L 2031/32; B60B 5/00; B60B 5/02; B60B 3/02; B60B 3/10
See application file for complete search history.

(56) References Cited

U.S. PATENT DOCUMENTS 4,100,247 A * 7/1978 Shead ................. B29C 33/123
                                                      264/275
4,173,992 A * 11/1979 Lejeune .................. B60B 5/02
                                                      152/381.3
(Continued)

OTHER PUBLICATIONS

International Search Report and Written Opinion dated Aug. 28, 2017, including PCT Recordation of Search History, from corresponding PCT Patent Application No. PCT/US17/36374, 17 pages.

(Continued)

*Primary Examiner* — Jason R Bellinger
(74) *Attorney, Agent, or Firm* — Fitch, Even, Tabin & Flannery LLP

(57) ABSTRACT

A hybrid wheel for vehicles that includes a unitary lug structure, with a mount face and a dish section of the lug structure extending therefrom. The lug structure is usually a cast aluminum alloy. A wheel structure including a high strength polymer encapsulates a portion of the lug structure dish section. Rim ring(s) are included in the wheel structure and are preferably made of a fiber reinforced high strength polymer.

18 Claims, 9 Drawing Sheets

(51) Int. Cl.
*B29C 45/16* (2006.01)
*B60B 3/02* (2006.01)
*B60B 3/12* (2006.01)
*B22D 21/04* (2006.01)
*B29K 105/10* (2006.01)
*B29K 307/04* (2006.01)
*B29K 309/08* (2006.01)
*B29K 705/02* (2006.01)
*B29L 31/32* (2006.01)

(56) References Cited

U.S. PATENT DOCUMENTS

| | | | | |
|---|---|---|---|---|
| 4,252,378 A | * | 2/1981 | DeBolt | B60B 5/02 264/DIG. 6 |
| 4,471,999 A | * | 9/1984 | Browne | B60C 23/18 301/6.91 |
| 5,073,315 A | | 12/1991 | Bertelson | |
| 5,277,479 A | * | 1/1994 | Koyama | B60B 5/02 301/6.91 |
| 5,779,951 A | | 7/1998 | Osborne | |
| 6,315,367 B1 | | 11/2001 | Lawrence | |
| 7,083,238 B2 | | 8/2006 | Clements | |
| 2010/0013119 A1 | | 1/2010 | Meggiolan et al. | |
| 2013/0049443 A1 | * | 2/2013 | He | B60B 5/02 301/64.703 |
| 2013/0221731 A1 | | 8/2013 | Hess | |
| 2014/0346845 A1 | | 11/2014 | Renner | |

OTHER PUBLICATIONS

International Preliminary Report on Patentability in corresponding PCT Application No. PCT/US2017/036374, dated Dec. 18, 2018, 10 pages.

* cited by examiner

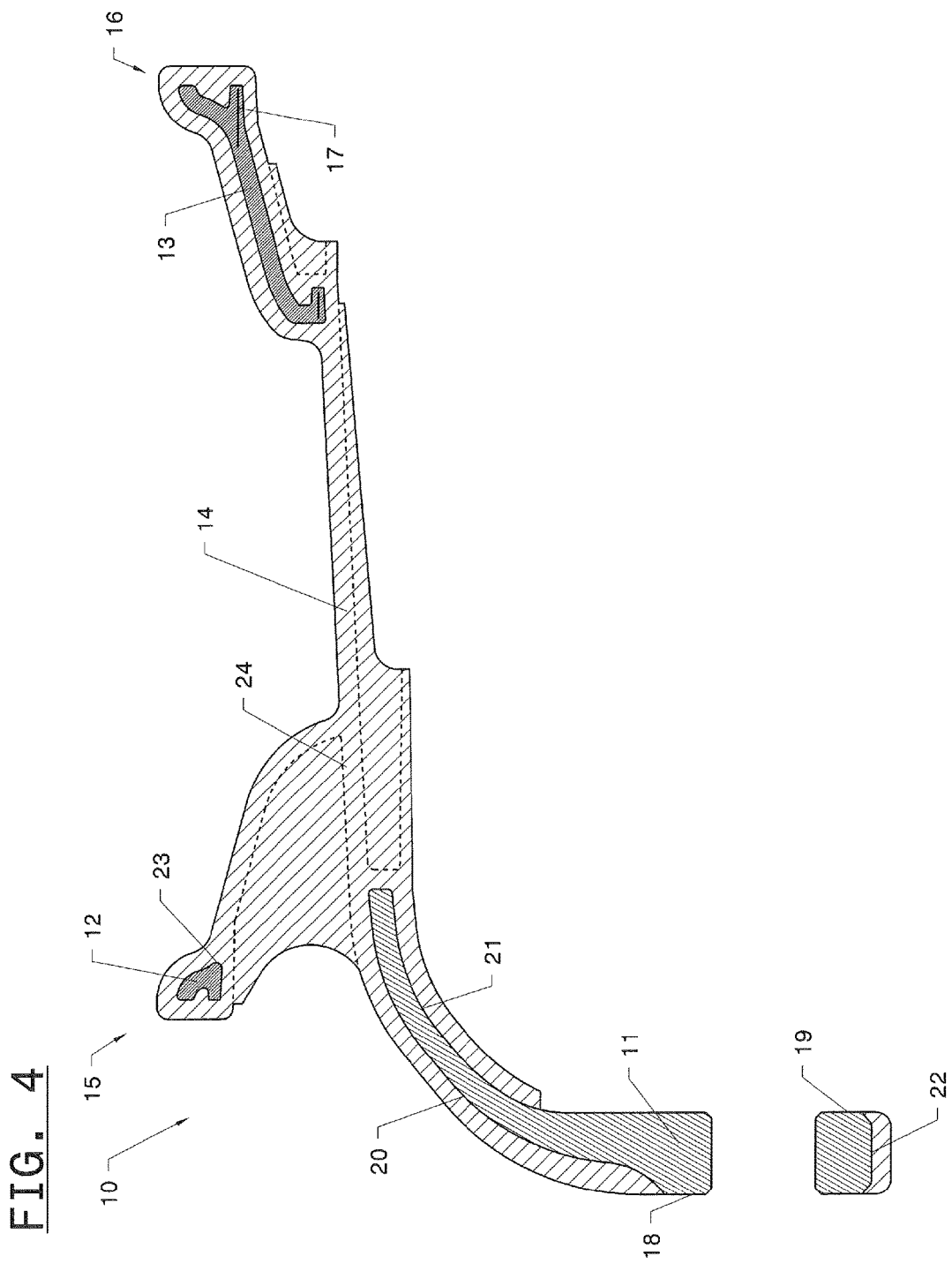

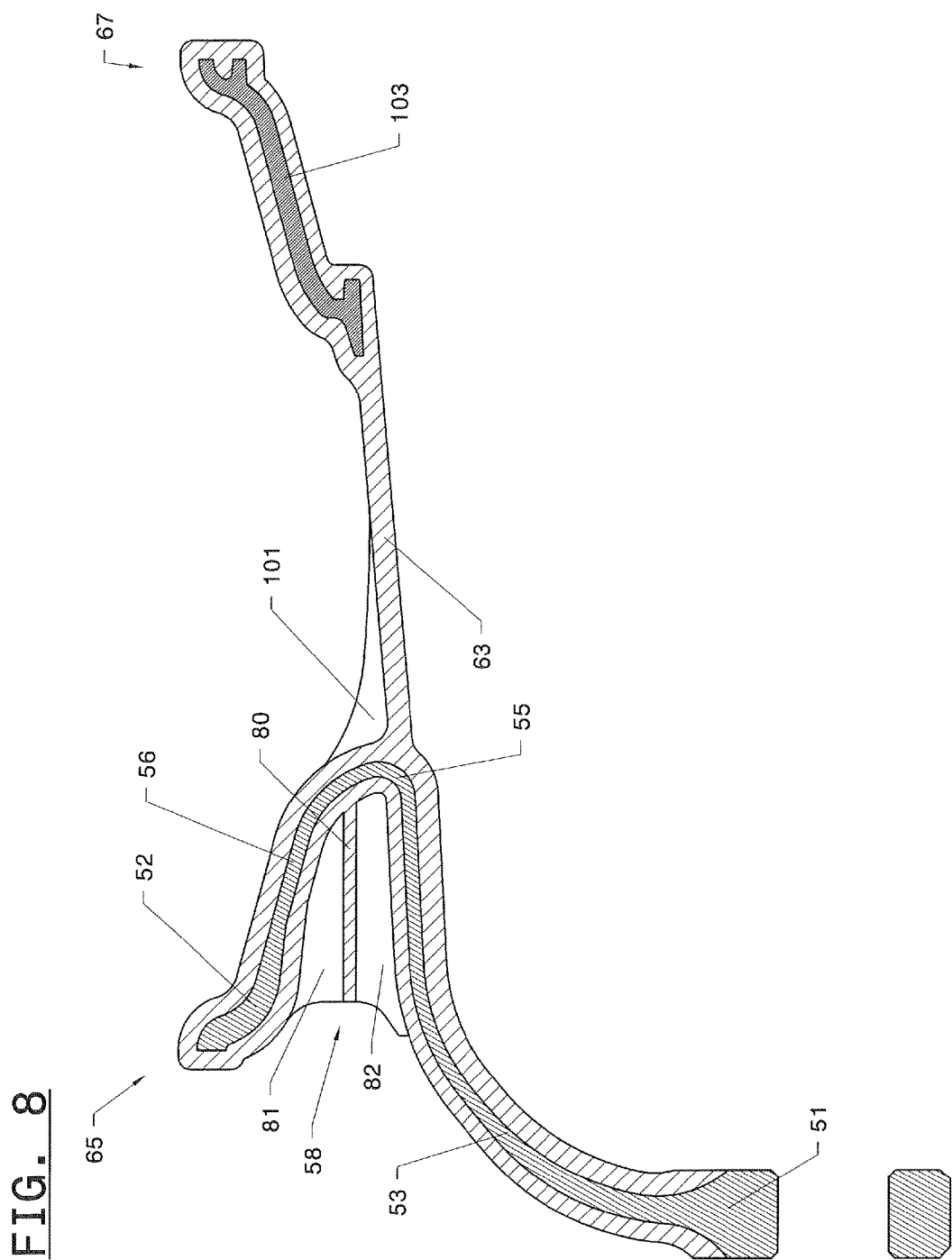

TRUCK WHEEL

BACKGROUND

Un-sprung, rotating mass such as in wheels in a vehicle effects efficiency and handling. A reduction in mass of the wheel results in increased vehicle performance and increased payload capacity. Toward this goal, attempts have been made in which weight has been reduced, especially in wheels for heavy duty truck applications. Unfortunately, these wheels often use exotic materials and expensive manufacturing processes resulting in a wheel that is not cost efficient.

SUMMARY OF THE INVENTION

An object of the present invention is to provide a lighter weight wheel that is especially useful in heavy truck applications. A method of manufacturing such a wheel is also part of the present invention.

In one embodiment, the present invention provides a hybrid wheel that comprises a unitary lug structure, with a mount face and a dish section of the lug structure extending therefrom. A wheel structure comprising a high strength polymer encapsulates a portion of the lug structure dish section. A reinforcement ring or rings may be encapsulated within the wheel structure, and then selected sections of the cast lug structure are removed for lightening.

Another aspect of the present invention is to provide a hybrid wheel manufacturing process including the steps of manufacturing a cast lug structure, over-molding a portion of a dish section of the lug structure and reinforcement rings with a wheel structure of high strength polymer, and then removing sections of the cast lug structure for lightening.

The hybrid wheel of the present invention can be utilized in vehicles or heavy trucks in both drive wheels or trailers that may include multiple hybrid wheels.

BRIEF DESCRIPTION OF THE DRAWINGS

In the drawings,

FIG. 4 is a partial cross sectional view of a hybrid wheel in accordance with an embodiment of the present invention;

FIG. 8 is a partial cross sectional view of a hybrid wheel in accordance with an embodiment of the present invention.

DETAILED DESCRIPTION

Figure 1:
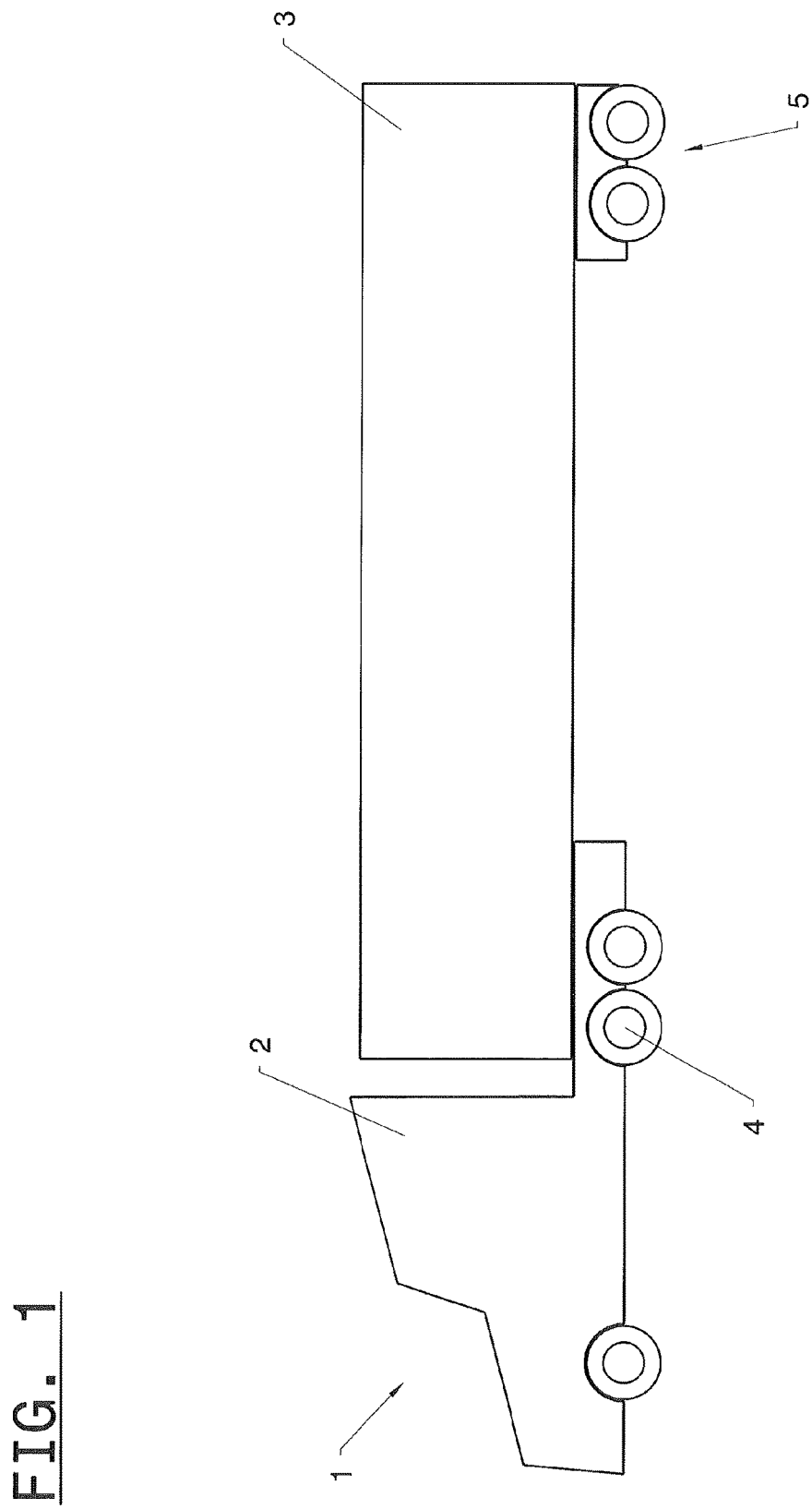
FIG. 1 is a side view of a vehicle that includes multiple sets of hybrid wheels.

Referring to FIG. 1, a vehicle (1) includes a tractor (2) coupled with a trailer (3). Tractor (2) is driven by a first embodiment of a hybrid wheel (4). Trailer (3) is shown with a set of hybrid wheels (5). While hybrid wheel (4) is shown as a drive wheel, hybrid wheel (4) can also be a driven wheel or a turning wheel. While vehicle (1) is shown as a commercial haulage truck, hybrid wheel (4) can be utilized in other vehicles such as an automobiles, sport utility vehicles, vans, or light trucks.

Figure 2:
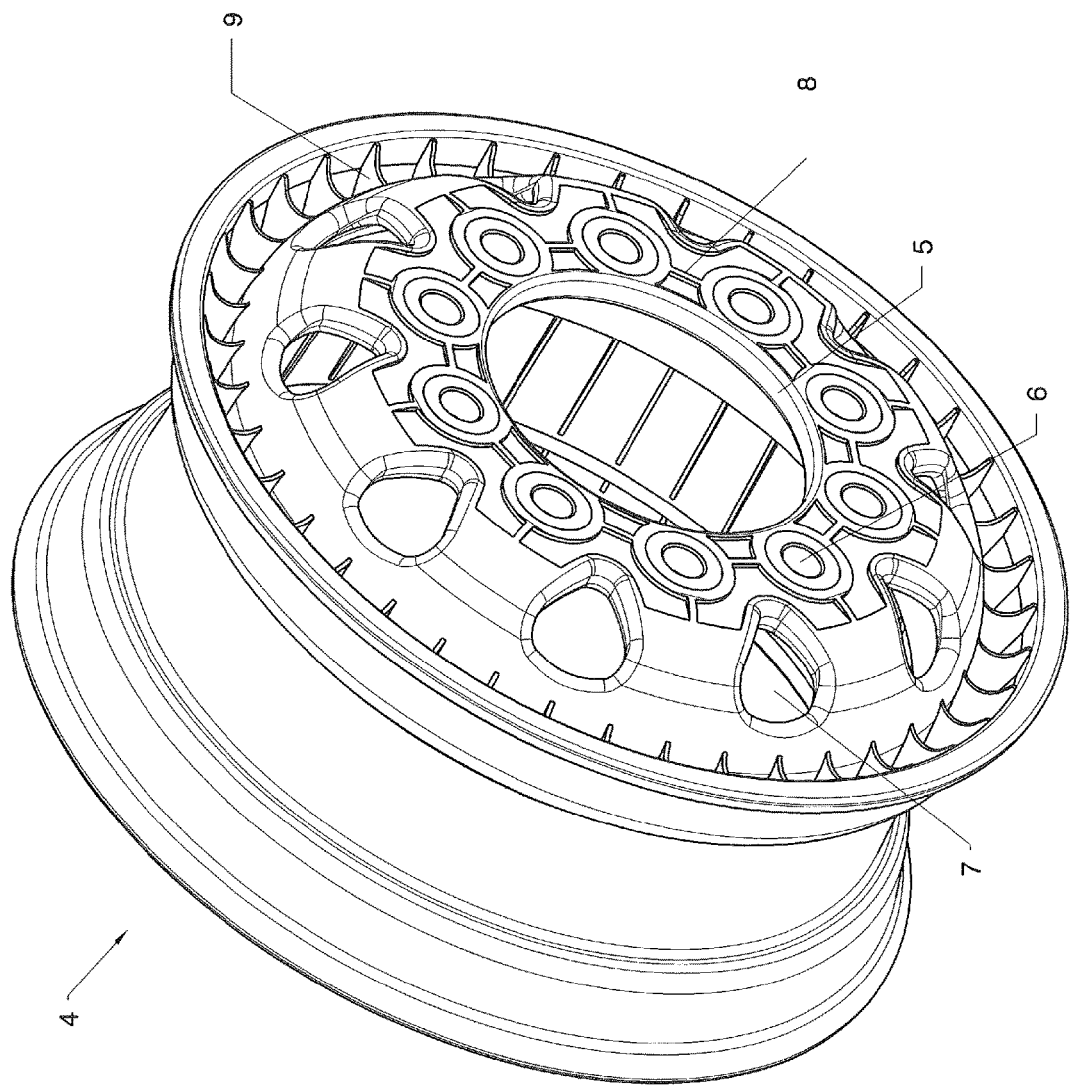
FIG. 2 is a perspective view of a hybrid wheel in accordance with an embodiment of the present invention.
Figure 3:
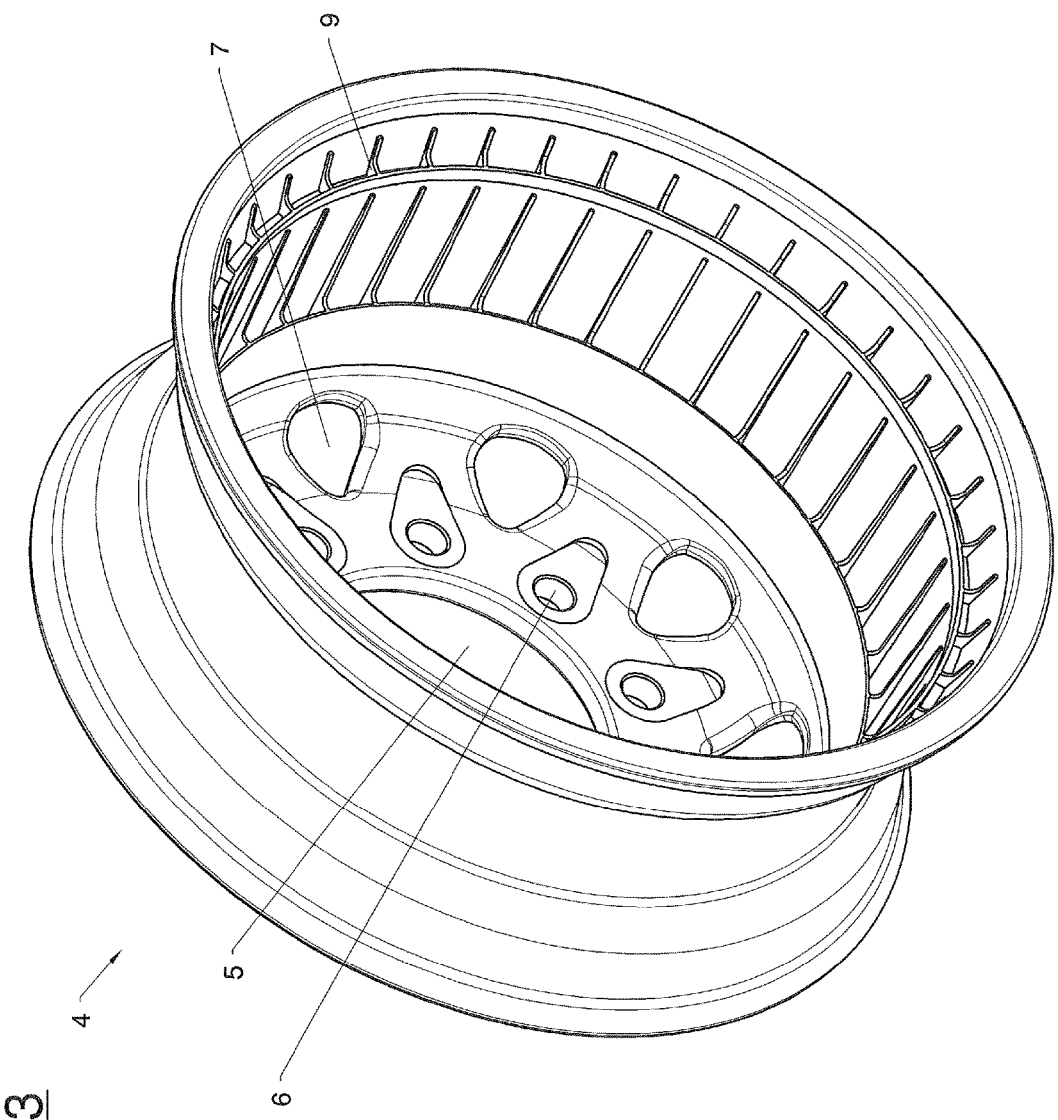
FIG. 3 is a reverse perspective view of a hybrid wheel in accordance with an embodiment of the present invention.

Turning to FIGS. 2 and 3, a first embodiment of a hybrid wheel (4) is shown. Hybrid wheel (4) comprises a first opening (5) to accommodate a vehicle axle hub, and a plurality of second openings (6) utilized to accept lug bolts. A plurality of third lightening openings (7) surround the second openings (6). Lug reinforcement ribs (8) surround second openings (6) and rim reinforcement ribs (9) surround third openings (7).

Figure 4A:
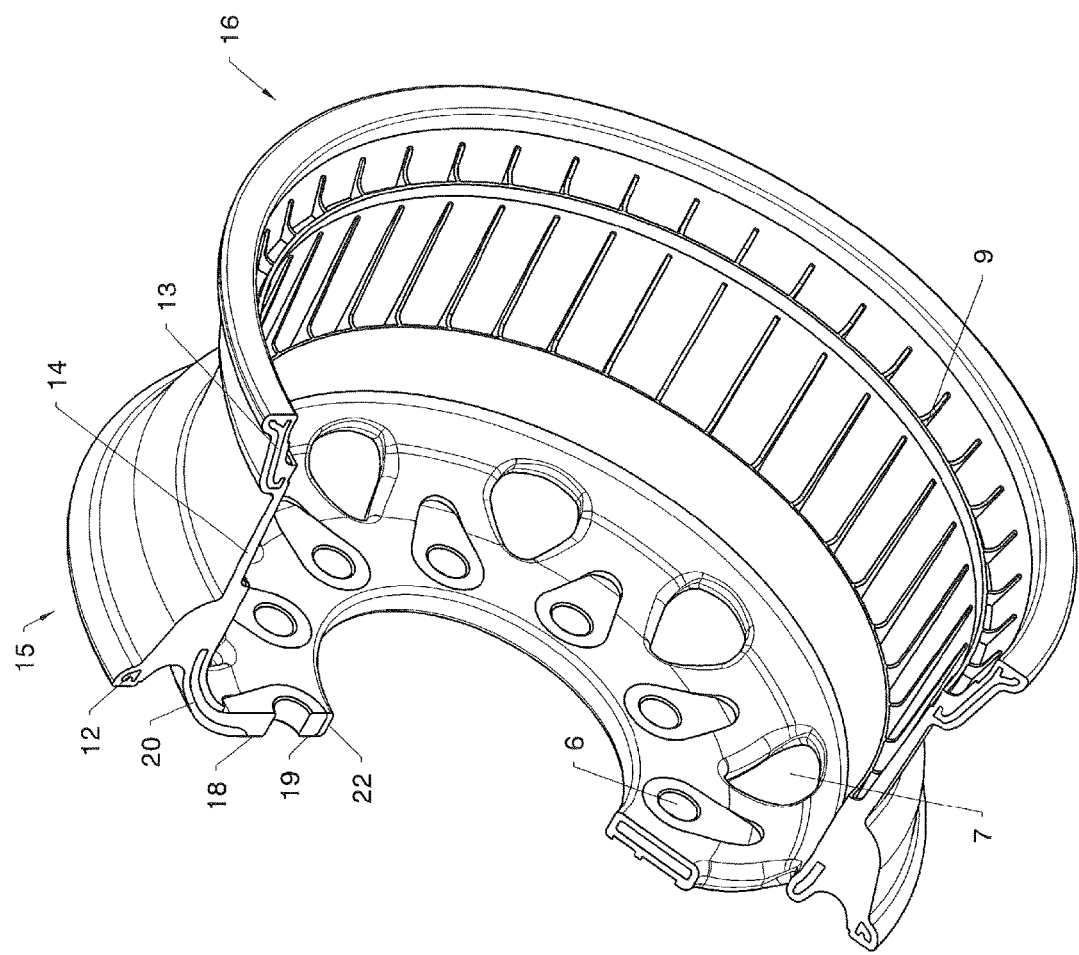
FIG. 4A is a reverse perspective view in partial cross sectional view of a hybrid wheel in accordance with an embodiment of the present invention.

In FIGS. 4 and 4A, a radial cross sectional view (10) through a section of hybrid wheel (4) is shown. Hybrid wheel (4) cross section shows a unitary lug structure (11) which comprises inner mount face (18) and dish section (20) extending therefrom. Wheel structure (14) is seen to encapsulate a portion of lug structure dish section (20) as well as encapsulating inner rim ring (12) and outer rim ring (13). Wheel structure (14) includes an inner rim section (15) and an outer rim section (16). Inner rim ring (12) is near to inner rim section (15) and outer ring (13) is near to outer rim section (16). Outer rim ring (13) encapsulates a plurality of strengthening ribbon (17). Wheel rim sections (15,16) are configured to accept and retain a tire (not shown).

In greater detail, unitary lug structure (11) includes an inner mount face (18) and an outer mount face (19). A preferred embodiment of lug structure (11) is shown with a dish section (20) extending and curving away from inner mount face (18) and extending substantially into the wheel structure (14) towards the outer rim section (16). Lug structure (11) is thickest around inner and outer mount faces (18,19) and thins toward dish section (20). Unitary lug structure (11) is preferably made of a robust aluminum alloy such as ASTM A356, cast under low pressure with a permanent mold set. Inner and outer mount faces (18,19) are preferably post cast machined smooth. The low pressure molding operation of lug structure (11) allows inner and outer mount faces (18,19) to withstand a high torque loading from wheel mounting bolts (not shown) torqued through second openings (6) without yield. Lug structure (11) is in contact with wheel structure (14) at material boundary (21) and material boundary (22). Lug structure (11) is preferably formed rough at the boundaries (21, 22). Inner rim ring (12) cross section profile is preferably U shaped and generally tapers to a point (23). Inner and outer rim rings (12,13) are preferably made of a long glass fiber oriented reinforced high strength polymer, formed in an injection molding operation. The injection mold gate position is preferably set to allow the material flow direction and long glass fiber orientation generally to run into the page. This long glass fiber orientation provides a substantial increase in overall ring stiffness. Outer rim ring (13) may be formed to include an over-mold ribbon (17). Ribbon (17) is preferably made from uni-directional carbon fiber weave, up to 0.5 mm thick, pre-formed into a cylinder shape and overlapped beyond 360 degrees. The uni-directional carbon fiber weave is preferably oriented generally into the page. Ribbon (17) is preferably pre-formed into generally canonical shapes, but due to the large geodesic curvature of the formed thin ribbon (17) in the present invention, it may be formed into a more complex helical shapes that can permeate throughout rings (12, 13). Alternatively, ribbon (17) can be made up of multiple cylinders formed over many angles running generally into the page. Ribbon (17) serves to increase stiffness of outer rim ring (13) and also negate weak points inherent in the injection molding process where the long glass fiber of the high strength polymer comes together at the far side of the injection molding operation of outer rim ring (13) known in the art as a knit line. Outer rim ring (13) preferably takes the profile form of a conjoined Y and is larger in cross section than ring (12). This is because ring (13) is further away from mount faces (18,19) so more stiffness is desired in that area.

Lug structure (11), inner rim ring (12) and outer rim ring (13) are placed and restrained inside an injection mold machine and a long glass fiber reinforced high strength polymer is injected to form wheel structure (14) over lug structure (11), with inner and outer rim rings (12, 13) included. Lug structure (11) may be pre-treated with a promoter to promote injected polymer adhesion to lug structure (11). The wheel structure (14) polymer is preferably direct drop injected into the mold at dead center of the wheel rotation axis. Wheel structure (14) polymer flows outward from this dead center, around lug structure (11) around inner rim ring (12) on and over outer rim ring (13) ultimately encapsulating inner and outer rim rings (12,13) and lug structure (11). Such a fill operation results in a continuous solid fill of long glass fiber, orientated generally radially across the page. The fiber orientation of wheel structure (14) generally runs perpendicular to the fiber orientation of inner and outer rim rings (12,13). This crossing of fiber direction provides an increase in rim stiffness. Inner and outer rim rings (12,13) also allow for a larger hybrid cross sectional area near to inner and outer rim sections (15,16) as would be the case if wheel structure (14) were formed with a constant wall thickness, without inner and outer rim rings (12,13) being present. In this embodiment, the increased cross sectional area provides added robustness where inner and outer rim sections (15,16) may be more prone to impact strike when in use. Wheel structure (14) wall thickness is shown in outline (24).

Wheel structure (14) is preferably molded without any openings so that knit lines are minimized. A post mold punching operation is usually used to pierce openings (5, 6, & 7). An alternative embodiment may use a machining operation to remove addendum material. Wheel structure (14) can also be formed to include receptacles for receiving electronic sensors or pressure gauges or the like with ease as such receptacles can be molded in.

Since inner and outer rim rings (12,13) are made of a high strength polymer and wheel structure (14) is also made of a high strength polymer, a good bond is created at the overmold boundary. The rough form of lug structure (11) enhances the mechanical interlocking of wheel structure (14) and lug structure (11) at the boundaries (21, 22). Post trimming operations on hybrid wheel (4) may include paint but this is not always necessary as the polymer can be molded with a color pigment.

Turning to FIG. 1, in one exemplary use, hybrid wheel (4) is manufactured for use with a tractor (2). Hybrid wheel (4) can also be used to rotationally support a trailer (3). In this example, hybrid wheels (4,5) are mounted back to back such that each hybrid wheel lug structure inner mount face (18 FIG. 4) are in contact and are bolted to a wheel hub together in a dual wheel configuration. Such a configuration results in a substantial number of wheels making up a large part of the un-sprung rotating mass of the vehicle (1). As each hybrid wheel (4) is made up of a substantial amount of plastic, each hybrid wheel (4) saves a significant weight over a steel wheel and even an aluminum alloy wheel, yet can meet industry requirements such as SAE J267.

Although the example of hybrid wheel (4) is shown comprising a first axle lug opening (5 FIG. 2), with a plurality of second openings (6 FIG. 2) and a plurality of third openings (7 FIG. 2), it will be understood that the number of holes present in the hybrid wheel (4) is related to the performance needs and load cases for each specific application. For example, the addition of lug reinforcement ribs (8 FIG. 2) and rim reinforcement ribs (9 FIG. 2) formed in the molding operation of wheel structure (14 FIG. 4) and the inclusion of inner and outer rim rings (12,13 FIG. 4), each encapsulating ribbon (17 FIG. 4), aid hybrid wheel (4) in meeting the loading requirement on a commercial vehicle or heavy truck. In an alternative embodiment, hybrid wheel (4) can be manufactured without ribbon (17 FIG. 4) or even without inner rim ring (12 FIG. 4) or outer rim ring (13 FIG. 4) when the loading requirements allow. In yet another embodiment, ribbon (17 FIG. 4) can be over-molded directly with wheel structure (14 FIG. 4).

The hybrid wheel manufacturing process detailed above allows a wheel to be manufactured at a lower cost, yet deliver performance improvements through weight savings over a steel or aluminum wheel. Cost savings are also provided over composite wheels made of somewhat exotic alloys.

Figure 5:
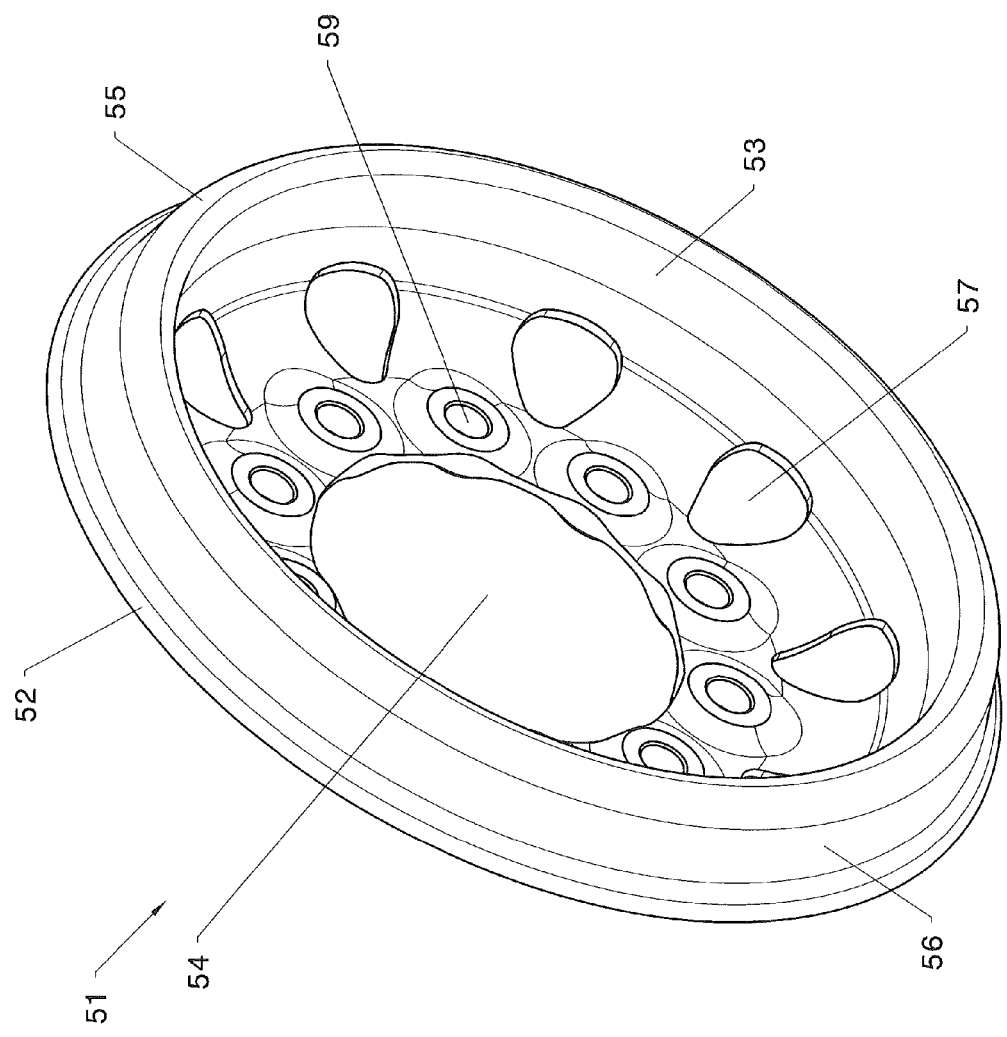
FIG. 5 is a perspective view of a unitary lug structure of a hybrid wheel in accordance with an embodiment of the present invention.

Referring now to FIG. 5, a second embodiment of unitary lug structure (51) is shown as a stand alone component, with dish section (53) extending therefrom. Unitary lug structure (51) also includes a bend radius (55) connecting dish section (53) to a return section (56). Unitary lug structure (51) also includes a lip section (52). Unitary lug structure (51) is usually an aluminum alloy formed in a casting operation. Unitary lug structure (51) may be cast with a first axle opening (54), second lug openings (59) and third lightening openings (57) formed in the casting process, or first second or third openings (54,57,59) may be punched or machined out after casting. Although unitary lug structure (51) is preferably cast aluminum, other metal forming processes could be used or even other materials having similar mechanical properties.

Unitary lug structure (51) is cast generally thickest at second lug openings (59) running thinner through dish section (53), bend radius (55) and return section (56), thickening again at lip section (52).

Figure 6:
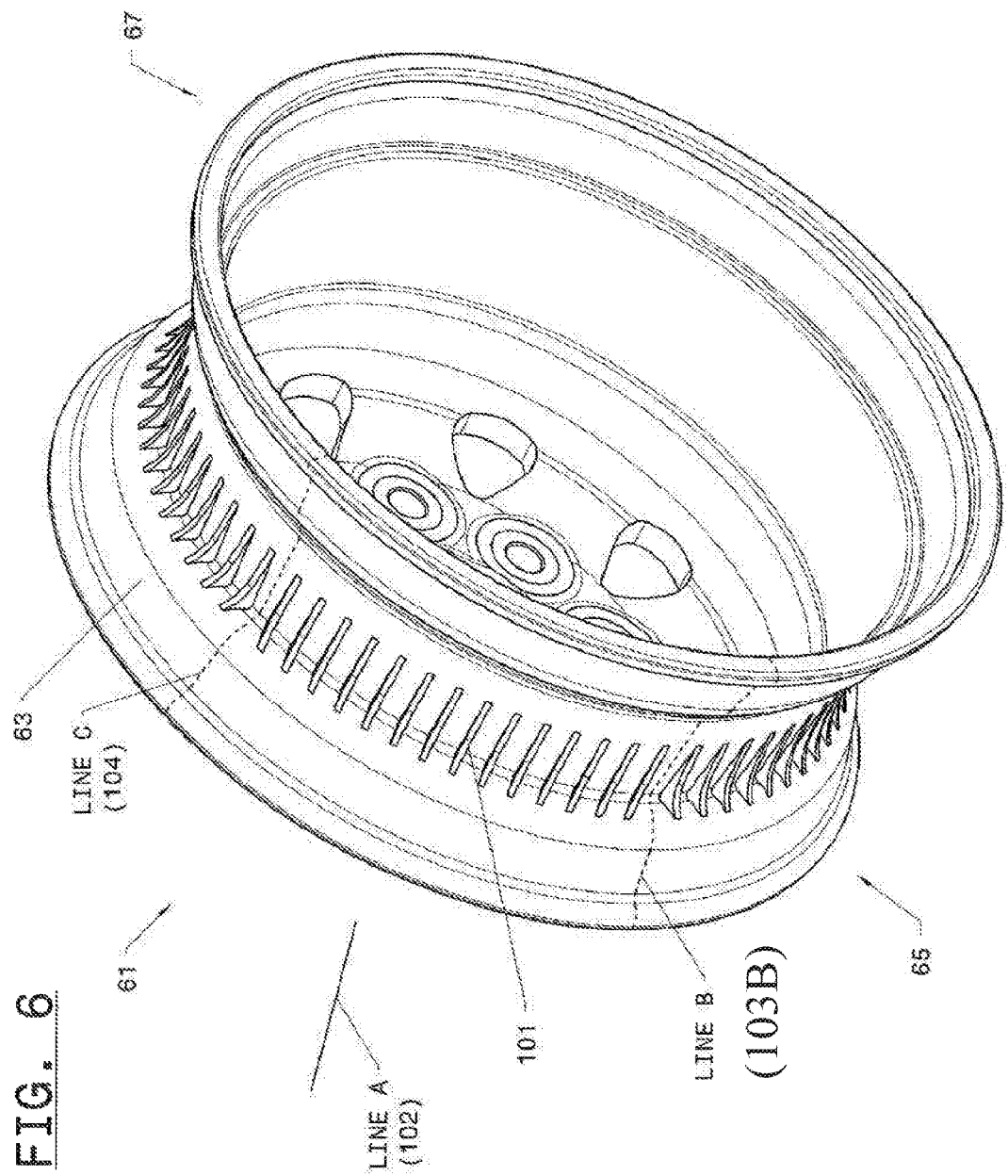
FIG. 6 is a reverse perspective view of a hybrid wheel in accordance with an embodiment of the present invention.
Figure 7:
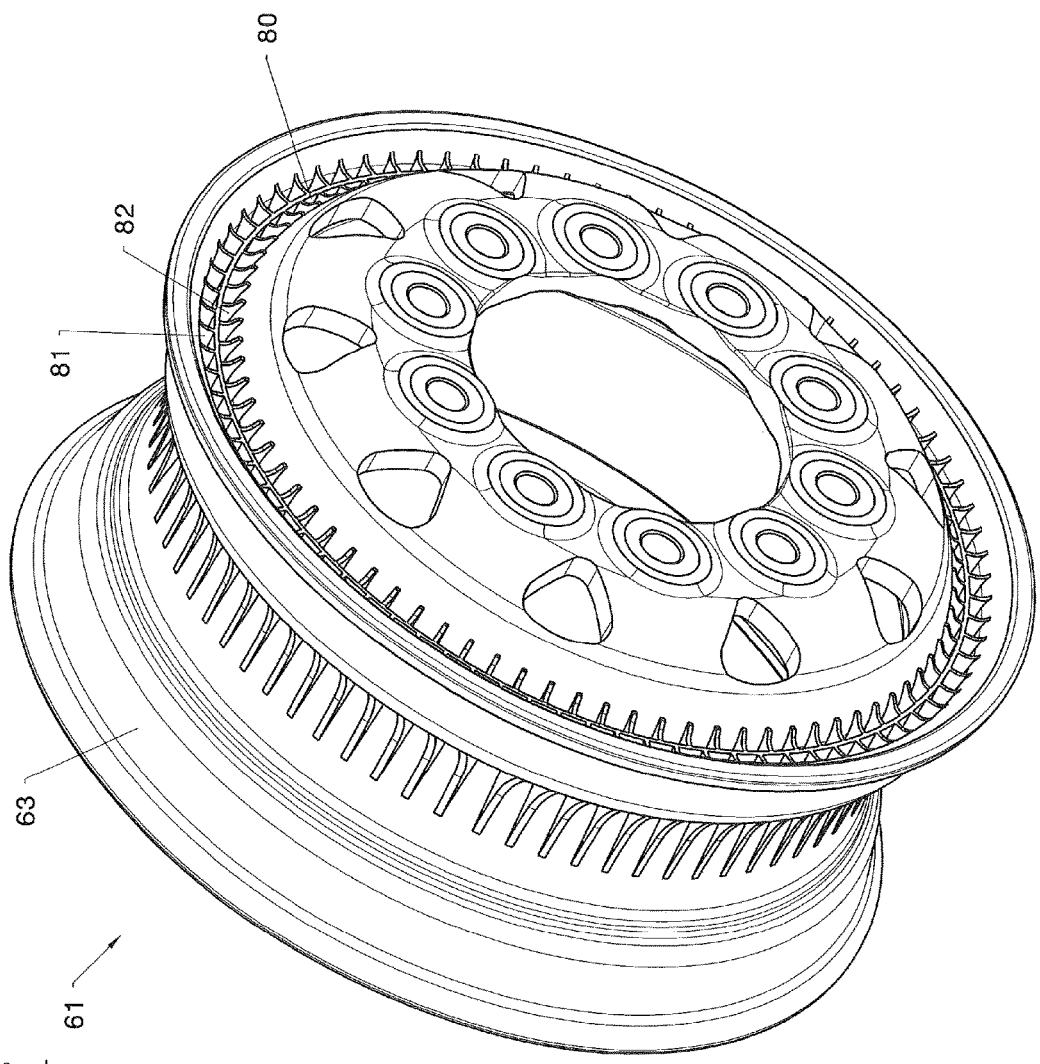
FIG. 7 is a perspective view of a hybrid wheel in accordance with an embodiment of the present invention.

Referring now to FIGS. 6, 7 and 8, a second embodiment of a hybrid wheel is shown at (61). Unitary lug structure (51) includes dish section (53) extending therefrom. Wheel structure (63) encapsulates a portion of dish section (53) and extends therefrom. Inner rim section (65) extends from wheel structure (63) and outer rim section (67) extends from a farther axial location of wheel structure (63). Wheel structure (63) is formed in an injection mold machine with a long glass oriented fiber reinforced high strength polymer is injected to form wheel structure (63) over lug structure (51).

Wheel structure (63) includes a plurality of periphery stiffening ribs (101). Periphery stiffening ribs (101) serve to aid load transfer proximate to unitary lug structure bend radius (55). Periphery stiffening ribs (101) are preferably injection molded in a horn pin slide action (not shown) ejected in the direction of Action line A (102). Action line A (102) preferably runs perpendicular to the main die line of the tool (not shown). The main tool die line runs parallel to wheel axis of rotation. Parting line B (103B) and Parting line C (104), present from the injection molding process, define the sides of the horn pin slide action (not shown). A plurality of horn pin slide actions form the periphery of wheel structure (63) between Inner rim (65) and outer rim (67) meeting at parting line B (103B) and parting line C (104). The plurality of Periphery stiffening ribs (101) between parting line B (103B) and parting line C (104) all are drafted in the direction of action line A (102). In the exemplary wheel structure shown, five horn pin slide actions each form a 72 degree section of wheel structure (63) periphery.

Unitary lug structure (51) bend radius (55) connecting dish section (53) to return section (56) makes up a concave gully (58). Unitary lug structure (51) extends to inner rim section (65) to help reinforce inner rim section (65) and increase rim stiffness. Lip structure (52) helps to increase the cross sectional area of inner rim section (65). Concave gully (58) is mold filled with an outer center rib (80) running concentric to outer rim section (67). Concave gully (58) is also mold filled with outer ribs (81) and inner ribs (82). Outer and inner ribs (81, 82) are preferably molded perpendicular to outer center rib (80). Outer center, inner and outer ribs (80,81,82) serve to reinforce and aid in dispersing wheel forces across concave gully (58). Inner ribs (81) and outer ribs (82) are preferably radially offset from each other as shown (FIG. 7). To further aid in wheel damping.

Outer rim section (67) over molds outer ring (103). Outer ring (103) can be injection molded using a low cost recycled material. Alternatively, outer ring (103) can be formed in the injection molding process directly using a low pressure structural foam process. Outer ring (103) runs endlessly throughout outer rim section (67). Outer ring (103) is used to increase the cross sectional area of outer rim section (67) thereby increasing rim stiffness. The use of a low cost recycled material does not inhibit hybrid wheel (61) from meeting industry performance needs such as SAE J1095. Where performance requirements permit, hybrid wheel (51) can be formed without outer ring (103) or even without extending unitary lug structure (51) into inner rim section (65).

In a typical manufacturing operation of a hybrid wheel in accordance with the present invention, the following steps take place.

In forming the unitary lug structure, an aluminum alloy lug structure is cast in a foundry operation, treated with a promoter, and then placed in an injection mold.

Meanwhile, a carbon fiber ribbon is roll formed. The carbon fiber ribbon is then placed in an injection mold and over molded with a polymer to form a rim ring. The molded rim ring is then placed into the injection mold holding the lug structure and the wheel structure is injection molded about the rim ring and the lug structure. Lug bolt openings and lightening openings are then punched or otherwise formed in the hybrid wheel.

What is claimed is:

1. A hybrid wheel, comprising:
   a unitary lug structure having a mount face and a dish section extending from the mount face;
   a wheel structure comprised of a polymer encapsulating a portion of the lug structure dish section and extending from the lug structure,
   the wheel structure having an inner rim section and an outer rim section;
   a lip section of the unitary lug structure within the inner rim section of the wheel structure, wherein the polymer of the inner rim section of the wheel structure encapsulates the lip section of the unitary lug structure;
   a plurality of lug openings in the unitary lug structure mount face,
   a lug reinforcement rib in the unitary lug structure mount face adjacent each lug opening, and
   a plurality of wheel structure reinforcement ribs in the wheel structure extending from the lug structure.

2. The hybrid wheel of claim 1,
   further comprising an outer rim ring within the outer rim section, wherein the polymer of the outer rim section encapsulates the outer rim ring.

3. The hybrid wheel of claim 2,
   wherein the outer rim ring is comprised of a polymer.

4. The hybrid wheel of claim 2,
   further comprising a strengthening ribbon within the outer rim ring.

5. The hybrid wheel of claim 3,
   wherein the outer rim ring polymer includes glass fiber orientated substantially cylindrically around the outer rim ring.

6. The hybrid wheel of claim 3,
   wherein the outer rim ring polymer includes glass fiber orientated substantially radially from a radial center of the hybrid vehicle wheel.

7. The hybrid wheel of claim 1,
   wherein the unitary lug structure is comprised of a cast aluminum alloy.

8. The hybrid wheel of claim 1,
   further comprising a plurality of lightening openings in the unitary lug structure mount face.

9. A method of manufacturing a hybrid wheel, comprising:
   casting a unitary lug structure having a mount face, a dish section extending from the mount face, and a lip section;
   injection molding a wheel structure comprised of a polymer to encapsulate a portion of the lug structure dish section such that the wheel structure extends from the unitary lug structure, and wherein the wheel structure has an inner rim section and an outer rim section;
   wherein injection molding the wheel structure includes encapsulating the lip section of the unitary lug structure in the inner rim section of the wheel structures;
   forming a plurality of lug openings in the unitary lug structure mount face,
   providing a lug reinforcement rib in the unitary lug structure mount face adjacent each lug opening, and
   providing a plurality of wheel structure reinforcement ribs in the wheel structure extending from the lug structure.

10. The method of manufacturing a hybrid wheel of claim 9,
    further comprising injection molding an outer rim ring within the outer rim section, wherein the polymer of the outer rim section encapsulates the outer rim ring.

11. The method of manufacturing a hybrid wheel of claim 10
    wherein the outer rim ring is comprised of a polymer.

12. The method of manufacturing a hybrid wheel of claim 11,
    further comprising providing a strengthening ribbon within the outer rim ring.

13. The method of manufacturing a hybrid wheel of claim 11,
    wherein the outer rim ring polymer includes glass fiber orientated substantially cylindrically around the outer rim ring.

14. The method of manufacturing a hybrid wheel of claim 11, wherein the outer rim ring polymer includes glass fiber orientated substantially radially from a radial center of the hybrid vehicle wheel.

15. The method of manufacturing a hybrid wheel of claim 9,
wherein the unitary lug structure is comprised of a cast aluminum alloy.

16. The method of manufacturing a hybrid wheel of claim 9, further comprising providing a plurality of lightening openings in the unitary lug structure mount face.

17. The hybrid wheel of claim 1,
wherein the inner rim section of the wheel structure includes a bead; and
the lip section of the unitary lug structure includes a radially outer portion within the bead of the inner rim section.

18. A hybrid wheel, comprising:
a unitary lug structure having a mount face and a dish section extending from the mount face,
a wheel structure comprised of a polymer encapsulating a portion of the lug structure dish section and extending from the lug structure,
the wheel structure having an inner rim section and an outer rim section,
a lip section of the unitary lug structure within the inner rim section of the wheel structure, wherein the polymer of the inner rim section of the wheel structure encapsulates the lip section of the unitary lug structure,
wherein the unitary lug structure includes a return section and a bend connecting the lip section to the dish section, and
wherein the return section, bend, and dish section define a concave gully of the unitary lug structure.

* * * * *